(12) United States Patent
Aaltonen et al.

(10) Patent No.: US 7,590,406 B2
(45) Date of Patent: Sep. 15, 2009

(54) METHOD AND SYSTEM FOR NETWORK RESOURCES ALLOCATION

(75) Inventors: Janne Aaltonen, Turku (FI); Timo Ahopelto, Helsinki (FI); Sami Saru, Turku (FI)

(73) Assignee: CVON Innovations Ltd., London (GB)

( * ) Notice: Subject to any disclaimer, the term of this patent is extended or adjusted under 35 U.S.C. 154(b) by 0 days.

(21) Appl. No.: 12/075,998

(22) Filed: Mar. 14, 2008

(65) Prior Publication Data
US 2008/0287113 A1 Nov. 20, 2008

Related U.S. Application Data

(60) Provisional application No. 60/930,837, filed on May 18, 2007.

(51) Int. Cl.
*H04M 11/00* (2006.01)
*H04M 3/00* (2006.01)
*G06F 15/173* (2006.01)

(52) U.S. Cl. .................. 455/405; 455/406; 455/407; 455/418; 709/226

(58) Field of Classification Search ............ 455/404.2, 455/405–411, 418–421, 432.3, 434, 435.1–435.2, 455/450–451, 452.1–452.2, 456.1–456.3, 455/456.5–456.6, 466, 509, 514–517, 550.1, 455/556.2, 560–561, 566, 414.3; 709/203, 709/216–217, 219, 225–229; 715/733–739, 715/740; 370/329, 341, 349; 707/3, 6–7, 707/10, 104.1, E17.001, E17.014, E17.018, 707/E17.036–E17.037, E17.042, E17.107–E17.108, 707/E17.122, E17.115–E17.117, E17.12, 707/E17.135; 705/8, 52
See application file for complete search history.

(56) References Cited

U.S. PATENT DOCUMENTS

| 5,613,213 | A | | 3/1997 | Naddell et al. |
| 5,943,657 | A | * | 8/1999 | Freestone et al. ........... 705/400 |
| 5,978,775 | A | | 11/1999 | Chen |

(Continued)

FOREIGN PATENT DOCUMENTS

| DE | 19941461 A1 | 3/2001 |
| EP | 1 061 465 A2 | 12/2000 |

(Continued)

OTHER PUBLICATIONS

European Search Report dated Aug. 1, 2008 issued by the European Patent Office in related EPO Application No. EP 08153651.8.

(Continued)

*Primary Examiner*—Meless N Zewdu
(74) *Attorney, Agent, or Firm*—Frishauf, Holtz, Goodman & Chick, P.C.; Robert P. Michal

(57) ABSTRACT

A method of recording allocation of resources in response to a request for a data item to be transmitted to a device in the network where the request comprises data indicative of one or more requested items. The device is typically a mobile device and the requested items can be key words making up a search request or can be web site names indicating web sites of interest to the user. In response to the request, data listings having items generating a match with the requested data item are identified and data indicative of a network location corresponding to the or each matched data item are retrieved. In addition data indicative of an amount of data and a resource allocation associated with the set of data accessible via the network location are retrieved and these data, together with a network subscription associated with device and the amount of data, are used to evaluate actual usage of network resources when accessing the set of data. If data are subsequently requested from the network location the evaluated actual usage is offset against the resource allocation so as to identify an amount of usage of network resources to be charged to the network subscription, and a record associated with said data listing is updated so as to log said resource allocation event.

118 Claims, 9 Drawing Sheets

U.S. PATENT DOCUMENTS

| | | | |
|---|---|---|---|
| 5,978,833 | A | 11/1999 | Pashley et al. |
| 5,978,841 | A | 11/1999 | Berger |
| 5,991,713 | A | 11/1999 | Unger et al. |
| 6,023,701 | A | 2/2000 | Malik et al. |
| 6,055,512 | A | 4/2000 | Dean et al. |
| 6,073,143 | A | 6/2000 | Nishikawa et al. |
| 6,138,113 | A | 10/2000 | Dean et al. |
| 6,148,334 | A | 11/2000 | Imai et al. |
| 6,178,460 | B1 | 1/2001 | Maddalozzo, Jr. et al. |
| 6,182,065 | B1 | 1/2001 | Yeomans |
| 6,256,648 | B1 | 7/2001 | Hill et al. |
| 6,334,145 | B1 | 12/2001 | Adams et al. |
| 6,658,464 | B2 | 12/2003 | Reisman |
| 6,690,394 | B1 * | 2/2004 | Harui ......................... 345/762 |
| 6,754,470 | B2 * | 6/2004 | Hendrickson et al. .... 455/67.11 |
| 6,850,530 | B1 * | 2/2005 | Waclawsky et al. ......... 370/401 |
| 7,194,552 | B1 | 3/2007 | Schneider |
| 7,490,045 | B1 * | 2/2009 | Flores et al. ................... 705/1 |
| 2002/0016736 | A1 | 2/2002 | Cannon et al. |
| 2002/0078147 | A1 | 6/2002 | Bouthors et al. |
| 2002/0120565 | A1 * | 8/2002 | Yu et al. ........................ 705/40 |
| 2002/0120682 | A1 * | 8/2002 | Funaki ........................ 709/203 |
| 2002/0138291 | A1 | 9/2002 | Vaidyanathan et al. |
| 2002/0175935 | A1 | 11/2002 | Wang et al. |
| 2003/0013483 | A1 | 1/2003 | Ausems et al. |
| 2003/0028896 | A1 | 2/2003 | Swart et al. |
| 2003/0040297 | A1 | 2/2003 | Pecen et al. |
| 2003/0080986 | A1 * | 5/2003 | Baird ........................... 345/700 |
| 2003/0197719 | A1 | 10/2003 | Lincke et al. |
| 2003/0208472 | A1 | 11/2003 | Pham |
| 2004/0010592 | A1 * | 1/2004 | Carver et al. ................. 709/226 |
| 2004/0034647 | A1 * | 2/2004 | Paxton et al. ................ 707/102 |
| 2004/0068527 | A1 | 4/2004 | Smith, III |
| 2004/0204133 | A1 | 10/2004 | Andrew et al. |
| 2004/0259526 | A1 | 12/2004 | Goris et al. |
| 2005/0044280 | A1 | 2/2005 | Reisman |
| 2005/0114229 | A1 | 5/2005 | Ackley et al. |
| 2005/0125397 | A1 | 6/2005 | Gross et al. |
| 2005/0138140 | A1 | 6/2005 | Wen et al. |
| 2005/0191989 | A1 * | 9/2005 | Plush et al. .................. 455/406 |
| 2006/0029097 | A1 * | 2/2006 | McGee et al. ............... 370/468 |
| 2006/0045245 | A1 * | 3/2006 | Aaron et al. ................. 379/111 |
| 2006/0059133 | A1 | 3/2006 | Moritani |
| 2006/0073810 | A1 * | 4/2006 | Pyhalammi et al. ......... 455/407 |
| 2006/0123014 | A1 | 6/2006 | Ng |
| 2006/0143027 | A1 * | 6/2006 | Jagannathan et al. ............ 705/1 |
| 2006/0161520 | A1 * | 7/2006 | Brewer et al. ................... 707/3 |
| 2006/0200460 | A1 | 9/2006 | Meyerzon et al. |
| 2006/0200541 | A1 | 9/2006 | Wikman et al. |
| 2006/0223495 | A1 * | 10/2006 | Cassett et al. ............... 455/405 |
| 2006/0286964 | A1 | 12/2006 | Polanski et al. |
| 2006/0288124 | A1 | 12/2006 | Kraft et al. |
| 2007/0030824 | A1 | 2/2007 | Ribaudo et al. |
| 2007/0073624 | A1 * | 3/2007 | Ishibashi et al. .............. 705/53 |
| 2007/0074262 | A1 | 3/2007 | Kikkoji et al. |
| 2007/0100805 | A1 | 5/2007 | Ramer et al. |
| 2007/0150483 | A1 | 6/2007 | Goldman et al. |
| 2007/0168336 | A1 | 7/2007 | Ramsil et al. |
| 2007/0179841 | A1 | 8/2007 | Agassi et al. |
| 2007/0180147 | A1 | 8/2007 | Leigh |
| 2007/0214132 | A1 * | 9/2007 | Grubb et al. .................... 707/5 |
| 2007/0287474 | A1 | 12/2007 | Jenkins et al. |
| 2008/0091796 | A1 * | 4/2008 | Story et al. .................. 709/217 |
| 2008/0155588 | A1 | 6/2008 | Roberts et al. |
| 2008/0281696 | A1 | 11/2008 | Whitehead |
| 2008/0288476 | A1 | 11/2008 | Kim et al. |

FOREIGN PATENT DOCUMENTS

| | | |
|---|---|---|
| EP | 1 109 371 A2 | 6/2001 |
| EP | 1 633 100 A1 | 3/2006 |
| GB | 2 414 621 A2 | 11/2005 |
| JP | 2002140272 | 5/2002 |
| WO | WO00/30002 A1 | 5/2000 |
| WO | WO 01/22748 A1 | 3/2001 |
| WO | WO 01/31497 A1 | 5/2001 |
| WO | WO 01/57705 A1 | 8/2001 |
| WO | WO 01/65411 A1 | 9/2001 |
| WO | WO 01/71949 A1 | 9/2001 |
| WO | WO 02/069585 A2 | 9/2002 |
| WO | WO 03/015430 A1 | 2/2003 |
| WO | WO 03/024136 A1 | 3/2003 |
| WO | WO 2006/119481 A2 | 11/2006 |

OTHER PUBLICATIONS

European Search Report dated Aug. 1, 2008 issued by the European Patent Office in related EPO Application No. EP 08153654.2
European Search Report dated Jul. 18, 2008 issued by the European Patent Office in related EPO Application No. EP 08 15 3656.
European Search Report dated Jul. 18, 2008 issued by the European Patent Office in related EPO Application No. EP 08 15 3658.
Office Action dated Mar. 3, 2009 issued in related U.S. Appl. No. 12/075,999 (14 pages).
United Kingdom Search Report under Section 17 dated Sep. 15, 2007 in connection with GB 0709604.3 (3 pages).
Search Report under Section 17 dated Mar. 2, 2008 issued in related U.K. Patent Application GB 0802196.6.
Office Action dated Apr. 28, 2009 issued in related U.S. Appl. No. 12/075,986 (16 pages).
Office Action dated May 7, 2009 issued in related U.S. Appl. No. 12/156,598 (12 pages).
Office Action issued from the U.S. Patent and Trademark Office dated Jul. 2, 2009 issued in related U.S. Appl. No. 12/075,986 (17 pages).
Office Action issued from the U.S. Patent and Trademark Office dated Jul. 10, 2009 issued in related U.S. Appl. No. 12/156,598 (9 pages).

* cited by examiner

| URL | Keywords | Resource allocation | Site Rating | Resource requirements |
|---|---|---|---|---|
| 6a | Cars, Engines, Motorbikes | 1€ max | 4 stars | File size: 2 M;B 5 click-through links |
| 6b | Spare Parts, Automotive | 0.2€ max | 2 stars | File size: 20 KB |
| 6c | Race replicas, motorbikes | 100% | 3 stars | File size: 100 KB; 2 selectable objects, each of 10 KB |

201 — URL
203 — Keywords
205 — Resource allocation
207 — Site Rating
209 — Resource requirements Ra → 6a
Rb → 6b
Rc → 6c

Fig. 2

METHOD AND SYSTEM FOR NETWORK RESOURCES ALLOCATION

CROSS-REFERENCE TO RELATED APPLICATION

This application claims the benefit of the filing dates of U.S. Provisional Patent Application Ser. No. 60/930,837 filed May 18, 2007 and GB Application No. 0709604.3 filed May 18, 2007, the disclosure of each of which is incorporated by reference herein.

FIELD OF THE INVENTION

The present invention generally relates to a method and system for allocating resources for accessing data within a public network and is particularly, but not exclusively, suited to providing access to data when the delivery of data is metered, such as when data are delivered to terminals connected to mobile networks.

BACKGROUND OF THE INVENTION

As is well known, the Internet provides access to huge numbers of web pages; increasingly the web pages include nested links and objects, the delivery of which can require what is sometimes a non-trivial amount of bandwidth. This is typically not a problem for requests received from terminals that are fixedly connected to the Internet (either directly, or via one of several network portions), and of course the transmission of data within the Internet—on a per request basis—is free. However, with the advent of widespread deployment of 3G networks, requests are increasingly being received from terminals connected to wireless networks. Unlike the transmission of data within fixed-line networks, the transmission of data within mobile networks is typically metered on a per transmission basis. As a result, mobile terminals are faced with hitherto unseen costs for accessing web sites.

SUMMARY

In accordance with aspects of the present invention, there is provided methods and systems according to the appended claims.

In some arrangements embodiments provide a method of recording allocation of resources in response to a request, the method comprising:

receiving a request for a data item to be transmitted to a device in the network, the request comprising data indicative of one or more requested items;

accessing a storage system so as to identify data listings having items generating a match with the requested data item;

retrieving data indicative of a network location corresponding to the or each matched data item, the network location providing access to a set of data corresponding to the matched data item;

retrieving data indicative of an amount of data and a resource allocation associated with the set of data accessible via the network location;

on the basis of a network subscription associated with device and the amount of data, evaluating actual usage of network resources when accessing the set of data;

in the event that the set of data are accessed from the network location, offsetting said evaluated actual usage against the resource allocation so as to identify an amount of usage of network resources to be charged to the network subscription; and updating a record associated with said data listing so as to log said resource allocation event.

These embodiments of the invention therefore provide a means of offsetting access to data from a given web site on the basis of a resource allocation associated with the network location, for example a web site. This can be pre-specified by the information provider associated with the web site. Preferably the data are transmitted to, and the evaluation is performed by, the device from which the request is received, such as a mobile device. However, in other arrangements the amount of data, the resource allocation and the corresponding network location are transmitted to a device other than the mobile device. The requested items can be key words making up a search request or can be web site names indicating web sites of interest to a user associated with the mobile device.

In either arrangement, data indicative of transport costs associated with the network subscription are retrieved and, when the device performing the evaluation is the mobile device associated with the network subscription, the transport costs can be retrieved from a removable storage device associated therewith, or from data provided by the corresponding network operator or input manually.

In the event that one or more data elements from the set are retrieved by the mobile device, data indicative of the actual usage of network resources is transmitted to a billing system maintained by the network operator associated with the network subscription. The actual usage can be used in decrementing an account balance, or, in the event that the resource allocation is accounted for after accessing the data, the actual usage of network resources can be used to increment the account balance associated with the network subscription.

In some embodiments the resource allocation can be weighted according to the size of one or more data element accessible from the network location, the number of nested links, and/or rating data associated with the network location whereby to evaluate said actual usage.

The mobile device can be arranged to display the data listings as a list of selectable links, which are ordered in dependence on the amount of usage of network resources to be charged to the network subscription. The links can be classified on the basis of the amount of usage of network resources to be charged to the network subscription; examples of such classifications include fully subsidised, partially subsidised and non-subsidised.

Embodiments of the invention can also comprise sending information about the network location to the mobile device prior to retrieving the data indicative of an amount of data and the resource allocation associated with the set of data accessible via the network location; typically this involves transmitting the set of data accessible via the network location to the device and receiving data indicative of selected elements from the set of data. These selected elements can then be used to adjust the amount of data (and thence the evaluated usage) associated with the set of data. Typically selection of a given element indicates that the element should be excluded from the download of data from the network location, and so effectively reduces the amount of data to be factored into the evaluation. The selection process can be dependent upon the amount of data to be downloaded, the number of nested links, ratings applied to the data, and other such characteristics.

According to another aspect of the present invention there is provided a mobile terminal configured to evaluate resource requirements in relation to data access from a given network location.

The embodiments are particularly well suited to use in the context of providing search results to a mobile terminal, because the transmission of data over wireless networks is chargeable.

Embodiments of the invention are particularly convenient for use in transmitting search results to a terminal connected to a mobile communications network.

According to a further aspect of the invention there is provided a method of identifying a characteristic of a set of data accessible via a link specifying a network location; the characteristics include size of elements of the set of data, rating applied to the set of data, amount of resource that has been allocated in relation to elements of the set of data etc. and the method comprises:

receiving a request for a said characteristic to be transmitted to a device in the network, the request comprising data indicative of a said link;

identifying a link listing generating a match with the requested link, said link listing being identifiable from a list comprising a plurality of link listings;

retrieving data indicative of a set of data accessible from the identified link listing;

identifying a said characteristic from the retrieved set of data on the basis of predefined characteristic request criteria; and transmitting data indicative of the identified characteristic to the device.

According to a yet further aspect of the present invention there is provided a user interface for a mobile device, the user interface being for use in designating an element of data as having a type of downloadable status (such as "not downloadable" or "downloadable"). The user interface preferably comprises display means arranged to display the set of data in conjunction with a plurality of selectable display objects, each being assigned to a given element of the set of data. The display means is responsive to selection of a given said display object so as to designate the element of data corresponding thereto as having a first type of downloadable status, and the mobile station is arranged to transmit data indicative of elements having said first type of downloadable status to a network node for use in controlling data subsequently transmitted to the mobile station.

This therefore provides a means of explicitly selecting or deselecting individual elements from transmission to the mobile station.

In accordance with further aspects of the invention there is provided a distributed system and apparatus for carrying out the method steps described above.

Further features and advantages of the invention will become apparent from the following description of preferred embodiments of the aspects of the invention, given by way of example only, which is made with reference to the accompanying drawings. It is to be understood that other embodiments may be utilized and structural and functional modifications may be made without departing from the scope and spirit of the present invention.

BRIEF DESCRIPTION OF THE DRAWINGS

FIG. 2 is a schematic diagram showing fields of several records stored within the search database shown in FIG. 1;

DETAILED DESCRIPTION OF THE INVENTION

Figure 1:
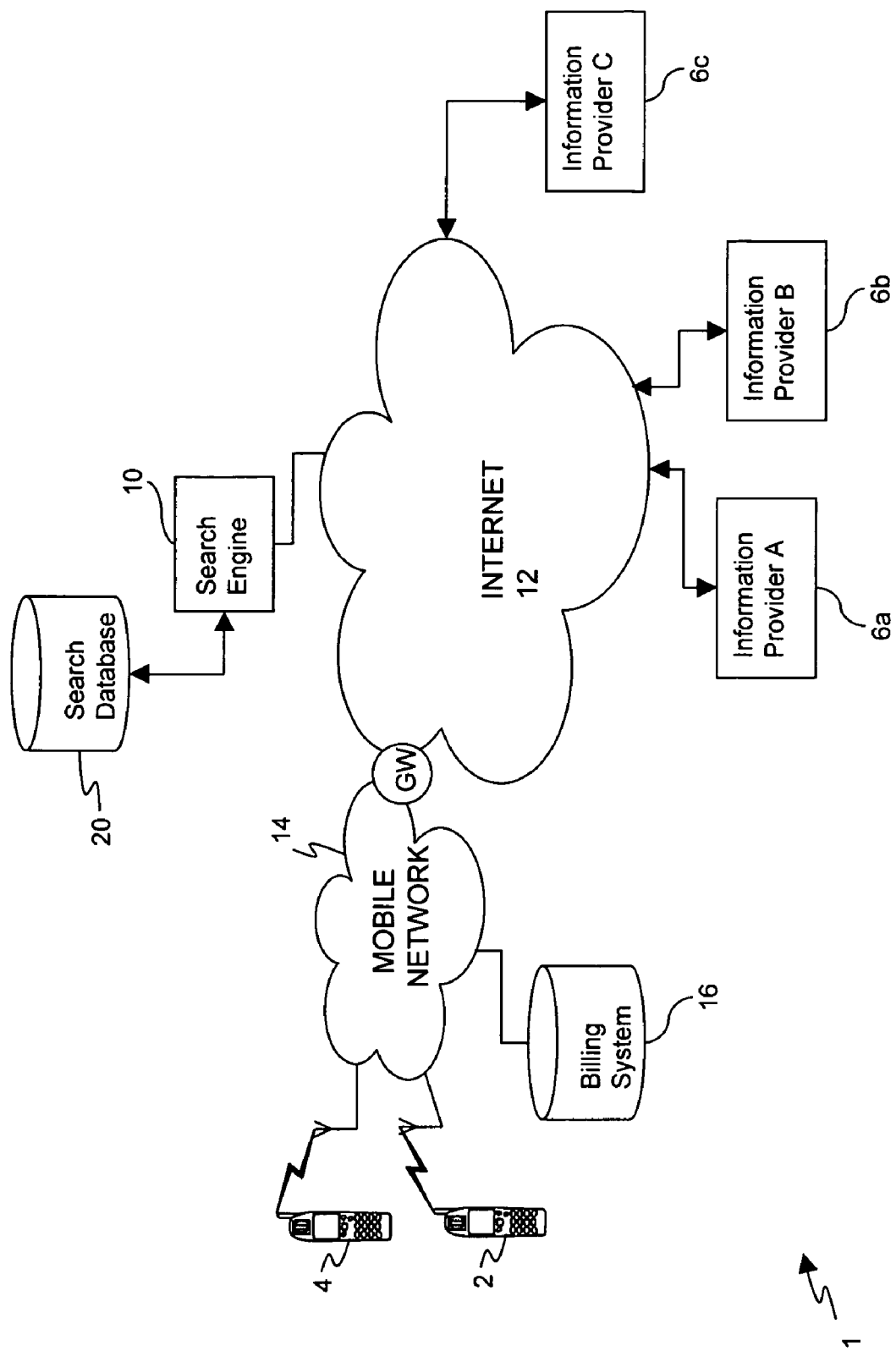
FIG. 1 is a schematic block diagram showing a distributed information system within which embodiments of the invention can operate.

As described above, embodiments of the present invention are generally concerned with allocating resources for providing providers and/or end users with access to publicly accessible material via devices such as mobile terminals. The nature of the process for quantifying the resource allocation and the criteria relating thereto is described in detail below, but first a description of the infrastructure needed to support some embodiments of the invention will be presented with reference to FIG. 1, which shows an example of a distributed information system 1. The current embodiment relates to servicing of search requests—i.e. requests for content corresponding to keywords; however, as will be appreciated from a full reading of the specification the invention applies to servicing a range of types of requests and accordingly is not to be limited to the realm of search engine technologies.

In the current embodiment the distributed information system 1 comprises a plurality of information providers 6a, 6b, 6c, at least some of which are arranged to store content and information, and a search engine 10, all of which are connected to a network 12 either directly or indirectly (e.g. via the Internet, local area networks (LANs), other wide area networks (WANs), and regional networks accessed over telephone lines, such as commercial information services). Mobile terminals 2, 4 are adapted to communicate with the various information providers 6a, 6b, 6c via mobile network 14 and an appropriate gateway GW, as shown; the terminals 2, 4 can be mobile telephones or PDAs, lap top computers and the like, and the mobile network 14 can comprise a licensed network portion (such as is provided by cellular networks using e.g. Global System for Mobile Communications (GSM) technology, Wideband Code Division Multiplex Access (WCDMA); Code Division Multiplex Access (CDMA), WiMax) and/or unlicensed network portions (such as is provided by Wireless LANs and Bluetooth technologies). The gateway GW can be a GPRS support node (GGSN) forming-part of the mobile network 14.

The mobile terminals 2, 4 comprise browser programs adapted to locate, and access data from, web sites corresponding to the or each information provider 6a, 6b, 6c. The browser programs allow users of the terminals 2, 4 to enter addresses of specific web sites, typically in the form of Uniform Resource Locators, or URLs, and are typically adapted to receive and display web and WAP pages; in the event that a given terminal 2 is only capable of processing and displaying WAP pages, translation of a web page can be performed by a device in the network or by suitable translation software running on the device 2. As is known in the art, any given web page can include links nested therein, which, when selected, can provide access to other pages or data such as plain textual information, or digitally encoded multimedia content, such as software programs, audio signals, videos graphics, etc. Accordingly selection of such links results in transmission of further data to the terminals 2, 4.

In accordance with conventional systems, the search engine 10 is operable to receive keywords of interest to the users of terminals 2, 4, and, by accessing data stored in the search database 20, to generate search results relating thereto. The search results are organised into a list of hypertext links to content that contain information relevant to these search terms; each link generally corresponds to a network location corresponding to a given information provider 6a, 6b, 6c.

As described above, embodiments of the invention are concerned with allocating resources for providing access to publicly accessible material via devices such as mobile terminals, and provide a mechanism for evaluating delivery costs to be borne by the subscriber and presenting the results in conjunction with these costs; this might be different to the actual delivery costs, since information providers can allocate resources for use in offsetting the actual delivery costs.

For each information provider 6a, 6b, 6c, the search database 20 can hold allocation records comprising data indicative of an allocation of resource for use in offsetting delivery costs associated with providing access to their content. The allocation records can comprise parameters specifying an allocation in absolute terms or in relative terms (e.g. as a percentage of the overall delivery costs), together with parameters specifying temporal data and location data that control applicability of the allocations. Furthermore the search database 20 can hold rating records comprising rating data gathered from third parties and recipients that have already accessed the content. These rating data preferably relate to usability of a given web site from the point of view of a user of a mobile device, and can be collected automatically or manually. The search database 20 can additionally hold resource requirement records, which specify data such as the size of the web page accessible via the URL associated with the information provider 6a, 6b, 6c, links that are nested within the web page, and objects accessible via the web site.

Rather than being stored within the search database 20, one or more of the allocation, storage and/or rating records can alternatively be held in a database (not shown) maintained by (a) third party/parties, in which case the search engine 10 can query the third party database in order to retrieve this information at the time of collating the search results.

These allocation and resource requirement data can be specified by a given information provider 6a, 6b, 6c via a form or similar (not shown), and in the case of the resource requirements data, software components associated with the search database 20 can be arranged to download the web page so as to verify, or correct, the submitted data. Once the data have been verified, the search database 20 stores the same in a database record corresponding to the information provider 6a; an example of a suitable schema is shown in FIG. 2. As can be seen, in this representation, any given record R comprises a plurality of fields: the URL corresponding to the information provider is stored in field 201, the keywords in field 203, the resource allocation amounts in field 205, site ratings in field 207, and resource requirements in field 209. It will be appreciated that FIG. 2 is highly schematic and that for example in the case of field 207, there the schema will most likely include subfields corresponding to respective elements thereof; for example, there could be a subfield corresponding to automatically generated rankings, manually generated rankings, and ratings specified by other users. Any given record can also include other fields such as an account balance for the information provider (as described in more detail below); conversely any given record can comprise a subset of the fields shown in FIG. 2.

Figure 3:
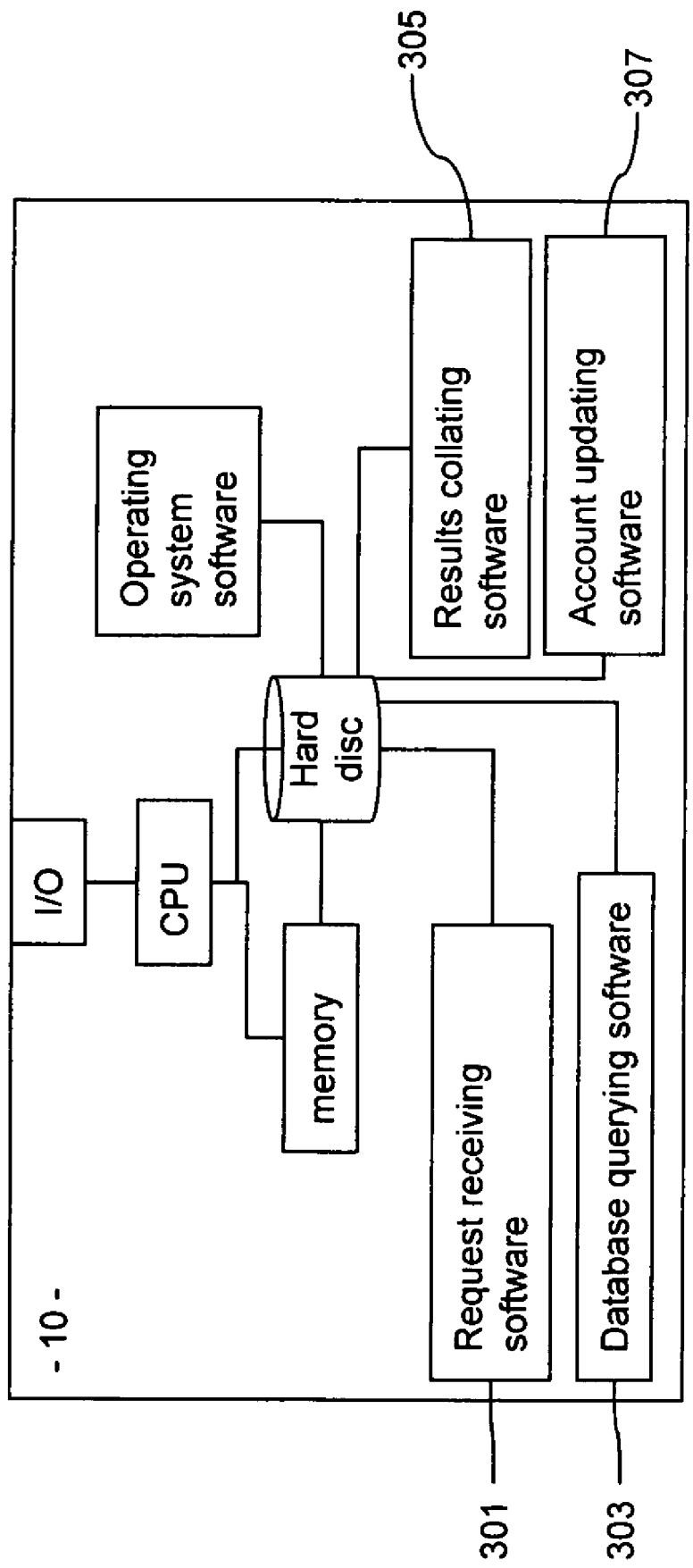
FIG. 3 is a schematic block diagram showing components of the search engine shown in FIG. 1.

The processes involved in collating the search results will now be described with reference to FIG. 3, which shows components of the search engine 10. The search engine 10 is preferably embodied as a web server, and comprises standard operating system, storage, processor, input/output interfaces, together with includes various bespoke software components 301, 303, 305. These software components are arranged, respectively, to receive a search request, identify keywords within the request (request receiving software component 301), to query the search database 20 on the basis of the keywords and generate corresponding search listings (database querying software component 303); the search listings are preferably accompanied by the resource allocation data 205, rating data 207, resource requirements data 209 in the search database 20 as described above. The request receiving software component 301 is also arranged to identify the terminal 2 to which the search listings are to be transmitted, so that the search results collating software component 305 can deliver the results and accompanying data to this terminal 2 in the form of a results message M1. Whilst shown as single units in FIG. 1, it will be appreciated that the search engine 10 and database 20 can comprise a plurality of units distributed in the Internet 12.

Figure 4:
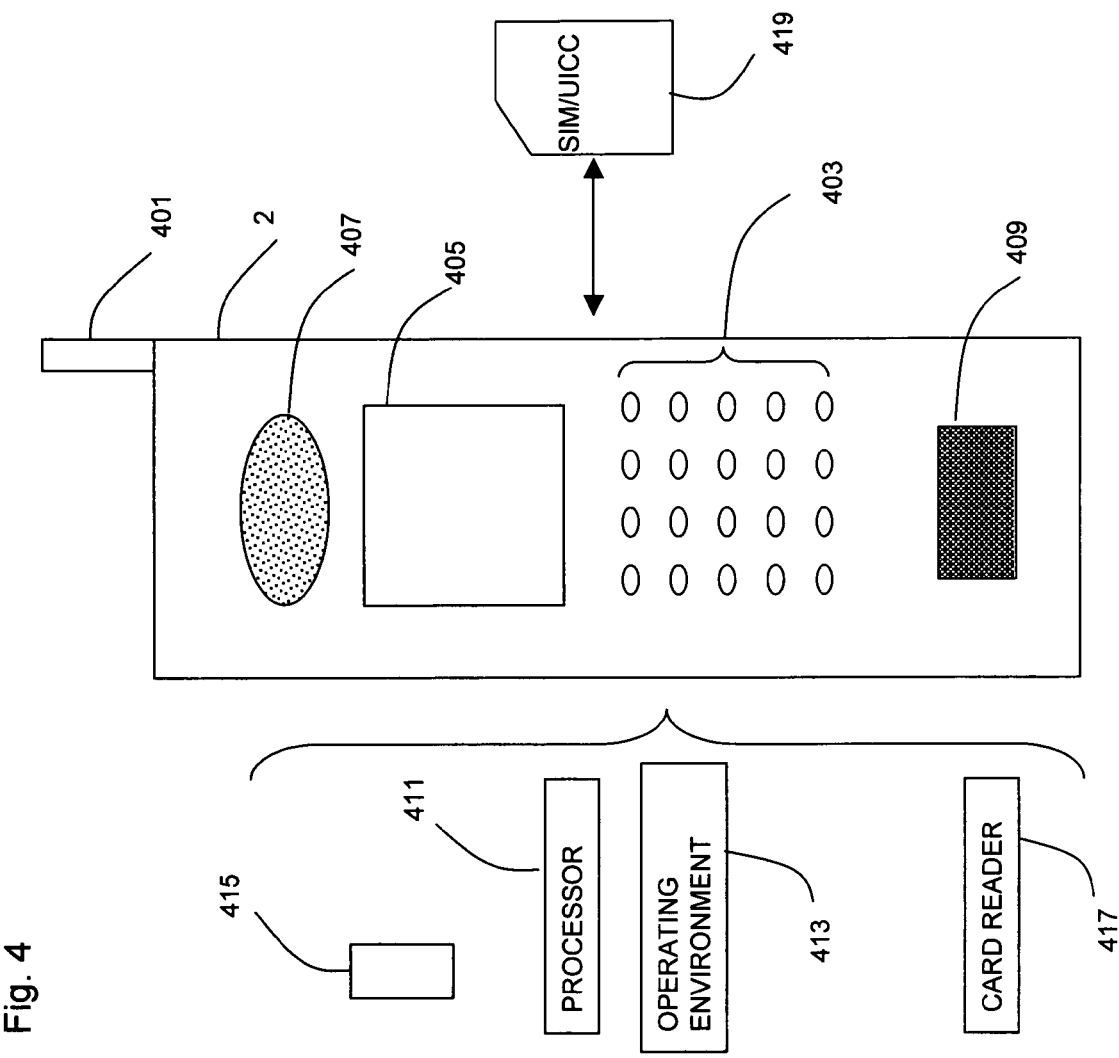
FIG. 4 is a schematic block diagram showing components of a mobile terminal configured according to embodiments of the invention.

It will thus be appreciated that in at least some embodiments the data returned to the mobile terminal 2 include, for any given search listing and thus information provider 6a identified to have content relating to the keywords submitted from the mobile terminal 2, data indicative of the amount of data retrievable from the information provider 6a, data indicative of the amount of resources that have been allocated by the information provider 6a to offset the costs of the mobile terminal 2 accessing the content, and data indicative of ratings applied to the content of the information provider 6a. Accordingly the mobile terminal 2 includes bespoke software processing components arranged to process these data in order to organise the results into various categories such as "free to access", "access subsidised", "fully chargeable". These software components will now be described with reference to FIG. 4, which shows components of the mobile terminal 2.

The mobile terminal 2 has an antenna 401 for communicating across the network 14 in known manner and provides a user interface, having a keypad 403 and display screen 405, a loudspeaker 407 and a microphone 409; alternatively the user interface could comprise components such as touch screens, touch pads and the like. The handset also comprises a processor 411, an operating environment 413 and various standard software applications such as a browser (as described above); the mobile terminal 2 is also provided with a smart card reader 417 of known type for interacting with a removable or non-removable SIM or a UICC 419, which may be provided with a processor, operating environment, and software applications. In order to process data according to embodiments of the invention, the mobile terminal 2 includes a search results processing software component 415, which can be embedded within the browser or can be a separate application running on the mobile terminal 2. It will be appreciated that the results processing component 415 could comprise means for sending the search request in the first instance, and thus be configured to monitor for the search results message M1 in response to the query in accordance with standard methods.

Operation of the various components of the distributed information system 1 when servicing a search request will now be described with reference to FIG. 5, which is a timing diagram showing the various messages and data transmission between components 2, 10, 20, 6a and 16. At step S5.1, the mobile terminal 2 sends a search request to the search engine 10 using the browser application of the terminal 2, the search request comprising one or more keywords of interest. In addition terminal related information such as data identifying the subscriber and the terminal used by the subscriber associated with the terminal 2 can be sent to the search engine 10 (or a different network component, which is in operative communication with the search engine 10); these identifying data are preferably encrypted and can include the International Mobile Subscription Identifier (IMSI), Mobile Station ISDN Number (MSISDN), International Mobile Equipment Identifier (IMEI), terminal type, memory configuration, software configuration, browser type and other identifiers available from the SIM 419 or the terminal 2 or a database in the terminal 2.

The search request is received by the search engine 10, having been routed via the mobile network 14, gateway GW and other network portions, and the request receiving component 301 extracts the keywords from the search request, formulating a query based thereon and sending same to the search database 20 (step S5.3). The search database 20 performs a lookup in respect of the keywords and retrieves data indicative of network location and other data stored within fields 201, 203, 205, 207 etc., and creates a message M1 as described above. The message M1 is then sent to the mobile terminal 2 (step S5.5).

Once the message M1 has been received, the search results processing software component 415 is arranged to identify the respective search listings therein, which is to say data specifying URL, resource allocation, rating, and resource requirement corresponding to information providers 6a ... 6c identified as having content relevant to the keywords contained within the search request. These data are then processed by the results processing component 415 using various algorithms in order to identify which of the information providers' content can be accessed for free or at a subsidised rate, and optionally, to identify ratings applicable to the content (step S5.7).

For example, assuming information provider 6a has a resource requirement of 3 MB (2 MB+5 click-through links), and that the provider 6a has specified an allocation of 1 € to offset the costs of accessing its content then the results processing software component 415 evaluates a subsidy per KB of content of 1 €3 MB=0.0003 €/kbyte. As described above, this effectively represents an amount that the sponsor is willing to subsidise for the mobile terminal 2 to receive data from its network location. Assuming information provider 6b has a resource requirement of 20 kbyte and has specified that it will pay 0.2 € to offset the costs of accessing its content, then the amount of subsidy for accessing the network location corresponding to provider 6b is 0.2/20=0.01€/kbyte; further, assuming information provider 6c has an overall resource requirement of 120 kbyte (100 kbyte+2 objects) and has specified "100% sponsorship" for accessing its content, then the entire cost of accessing the content will be offset by the information provider 6c.

These amounts are then compared against the actual transport costs associated with delivering data from the various network locations to the terminal 2: this information can be derived from delivery plan data stored either on the SIM 419, or delivered, upon request, to the terminal, from the operator in respect of which the terminal 2 is a subscriber, or can be entered manually. For example, assuming the costs of transport to terminal 2 are P=0.007 €/kbyte, then the costs of accessing data from information providers 6a, 6b, 6c are as follows:

Information provider 6a: 1 €/2 MB=0.0003 €/kbyte, which is less than the transport costs, so that, whilst the data is subsidised, it will nevertheless be delivered at a cost.

Information provider 6b: 0.2/20 kbyte=1.01 €/kbyte, which is greater than the transport costs, so that data will be delivered at no cost.

Information provider 6c: 0.3/120 kbyte=0.0025 €/kbyte, which is less than the transport costs; in any event, the information provider 6c has indicated that it will cover all of the transport costs, so that the data will be delivered at no cost.

The foregoing passages assume that all of the information providers listed in the search database 20 have submitted a non-zero allocation of resources for use in offsetting the costs of accessing their content. However, the search database 20 will also hold entries corresponding to information providers that are not interested in subsidising access to their content. Since the query performed by the database querying software component 303 will return all data corresponding to all information providers having entries in the database 20 associated with to the keywords specified in the search request, the message M1 will include entries corresponding to non-paying and paying information providers.

Figure 6:
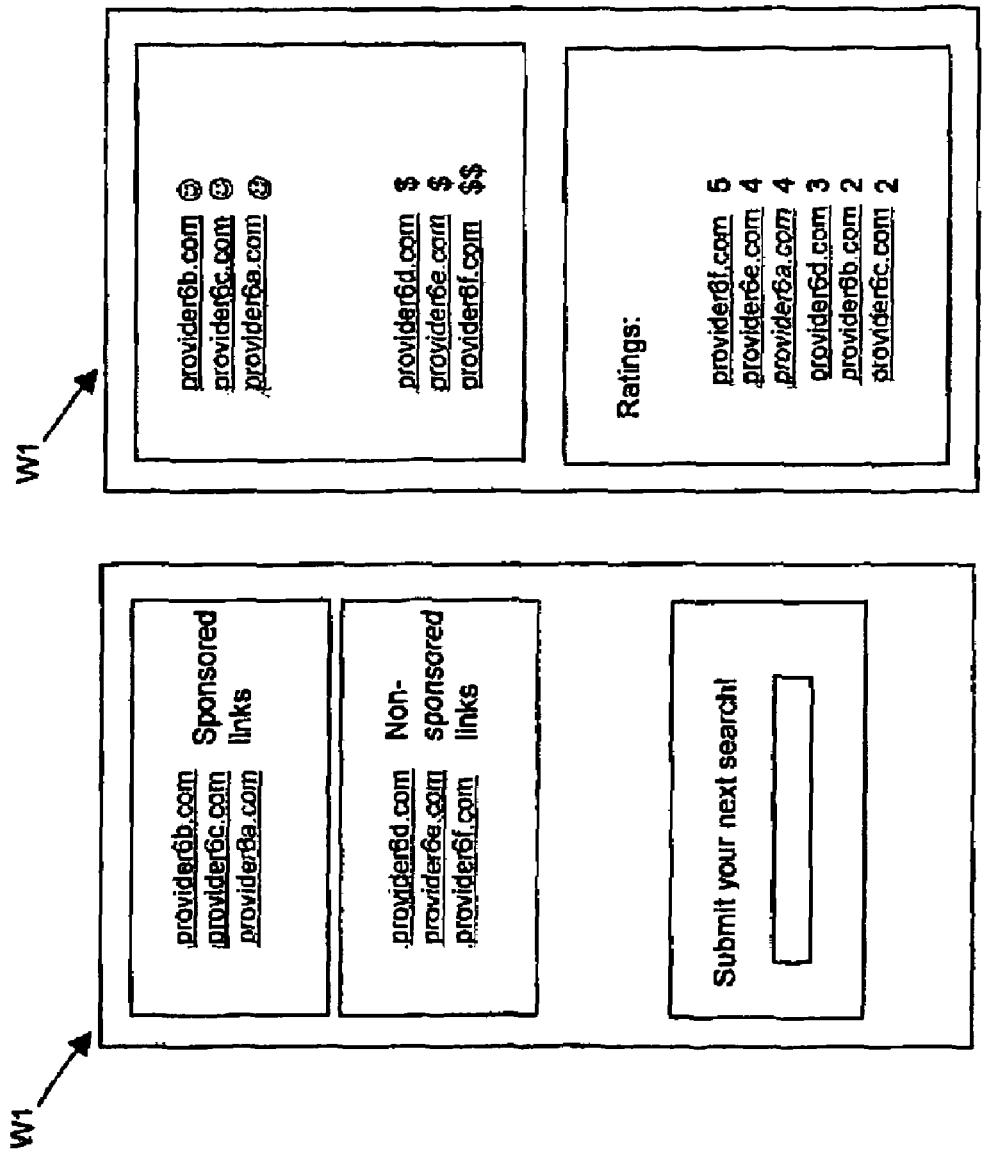
FIGS. 6a and 6b are schematic diagrams showing an example web page output from the search engine during the process shown in FIG. 5.

The search listings could be assigned one of the above-mentioned access categories ("free to access", "access subsidised", "fully chargeable"), and be presented to the recipient in the form of a URL link together with an indication of the assigned category. The rating data can additionally be presented in conjunction with the category, thereby providing an indication to the recipient of a generally accepted value of the content accessible from respective information providers 6a, 6b, 6c. Examples of possible graphical representations of this information are shown in FIGS. 6a and 6b, which show various forms of a results page W1 that can be output from the results processing software component 415. It will be appreciated that these are examples of possible ways of representing the output and that combinations of the various representations are possible.

When a link within the search listings is selected, this causes the terminal 2 to send an account identifier and URL corresponding to the selected listing to the search engine 10; the search engine 10, more specifically the account updating software component 307 thereof, is then responsible for updating the respective account together with providing a means of re-directing the request to the URL of the selected listing. Typically the account identifier is embedded as a parameter in the URL, but it could be embedded within a cookie that is transmitted to, and maintained at, the terminal 2 along with the results message M1.

Assuming the user to select one of the links appearing within the subsidised portion (e.g. information provider 6a), message M2 comprising account identification and/or the selected URL is transmitted to the search engine 10 (step S5.9). When received, the account updating component 307 sends a standard HTTP retrieval request to the URL listed within message M2, the request having, as source address, a network identifier corresponding to the terminal 2 (step S5.11).

Alternatively the search engine 10 returns information such a redirecting URL to the browser running on the mobile terminal 2. As an example, message M2 can comprise the following data:

```
http://www.search service.com/url?sa=L=0wSrvIS3DQoAgBUN z-&q=
http://www.infoprovider6a.com/p=1euro sponsor sKpNrit4Aw".
```

The message M2 will be analysed by the search engine 10, causing a redirection message to http://www.inforpovider6a.com to be returned to the terminal 2.

Data are then transmitted to the terminal 2 under control of the information provider 6a corresponding to the selected URL in response to the re-directed access request transmitted from the search engine 10 at step S5.11. It is to be noted that the data can be modified and/or selected based on the capabilities of the terminal 2, these being requested from the terminal 2 or derivable by the information source 6a on the basis of information held by the search engine 10 (e.g. based on the information transmitted from the terminal at steps S5.1 or S5.9).

Figure 5:
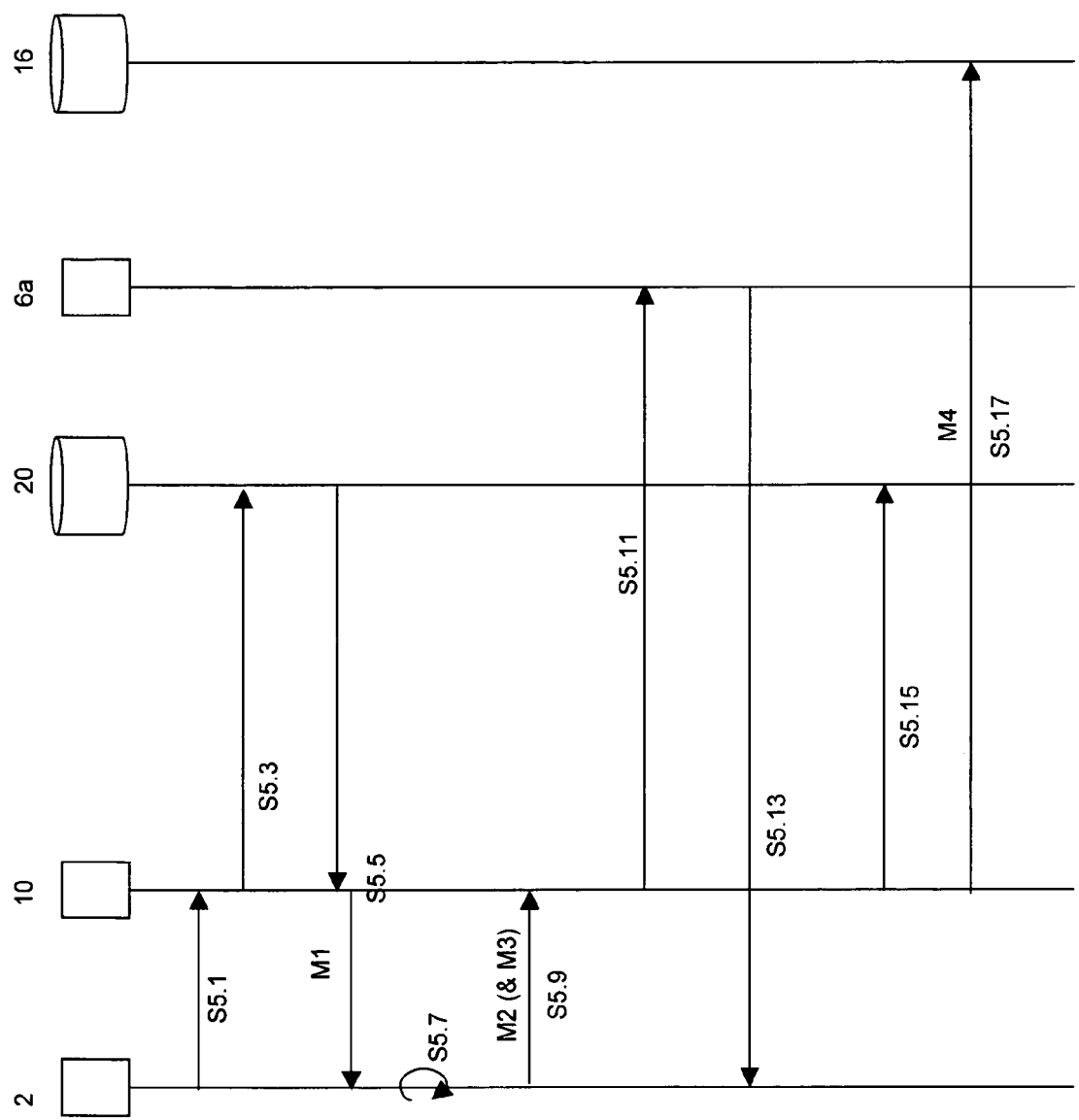
FIG. 5 is a timing diagram showing data flows between components of the distributed information system of FIG. 1 when operating according to a process of an embodiment of the present invention.

Whilst this is shown in FIG. 5 (step S5.13), it will be appreciated that transmission of data from the network location occurs independently of the components of data information system 1, and is shown for completeness only.

The account updating software component 307 accesses the search database 20 on the basis of account identifier retrieved from message M2, and at step S5.15 indicates that data have been accessed from this information provider 6a.

In one arrangement step S5.9 can additionally involve the mobile terminal 2 transmitting a further message M3 to the search engine 10, which includes data identifying the cost of accessing data from the information provider 6a (as identified by the results processing software component 415 at step S5.7). The message can include data identifying the subscriber associated with the terminal 2 (preferably encrypted); these identifying data preferably correspond to those data sent at step S5.1 and can include the International Mobile Subscription. Identifier (IMSI), Mobile Station ISDN Number (MSISDN), International Mobile Equipment Identifier (IMEI), memory configuration, software configuration, browser type and other identifiers available from the SIM 419 or the terminal 2 or a database in the terminal 2. In response to receipt of message M3 the account updating software component 307 can then update the account balance to account for the transport costs associated with delivering the content to the terminal 2. In such arrangements—those in which the transport costs are accounted for in real time—the search engine 10 can then send a message M4 to the billing system 16 associated with the mobile network portion 14 shown in FIG. 1. This message M4 includes data identifying the subscriber associated with the mobile terminal 2, derived from the message M3 sent at step S5.9, and again preferably formatted in encrypted form. Returning to FIG. 5, data indicative of the actual cost to the subscriber to receive data from the selected information provider 6a are thus transmitted to the billing system 16 at step S5.17, for use in incrementing the subscriber's balance to as to account for the fact that delivery of the content has been sponsored by the information provider 6a.

In a particularly advantageous arrangement these data are transmitted to the billing system at the same time as, or before, the request for content is transmitted to the information provider 6a at step S5.11, thereby ensuring that the subscriber's balance is "topped up" to include the subsidised costs or to ensure that data connection is allowed.

As an alternative to the mobile terminal 2 transmitting the evaluated transport costs to the search engine 10 at step S5.9, the account updating software component 307 can independently evaluate the transport costs on the basis of whichever data plan is associated with the network operator of the mobile terminal 2, this having been sourced from the various network operators by virtue of an agreement between the network operator and the search provider. In such arrangements the message M3 would simply include data identifying the subscriber of the mobile terminal 2 so that the account updating software component 307 can identify the transport costs applicable to delivery of data to this subscriber.

Figure 7:
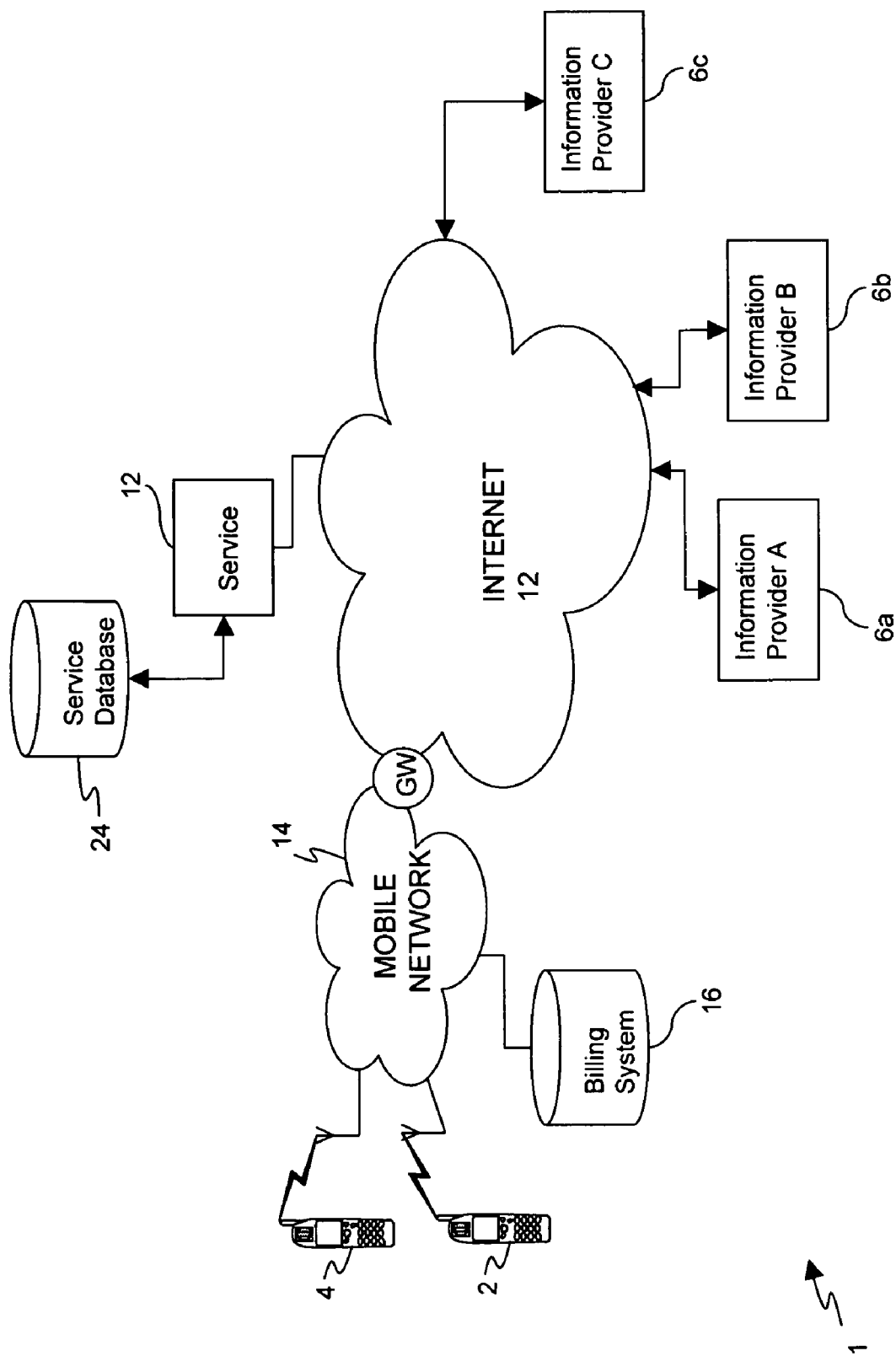
FIG. 7 is a schematic diagram showing an alternative distributed information system within which embodiments of the invention can operate.
Figure 8:
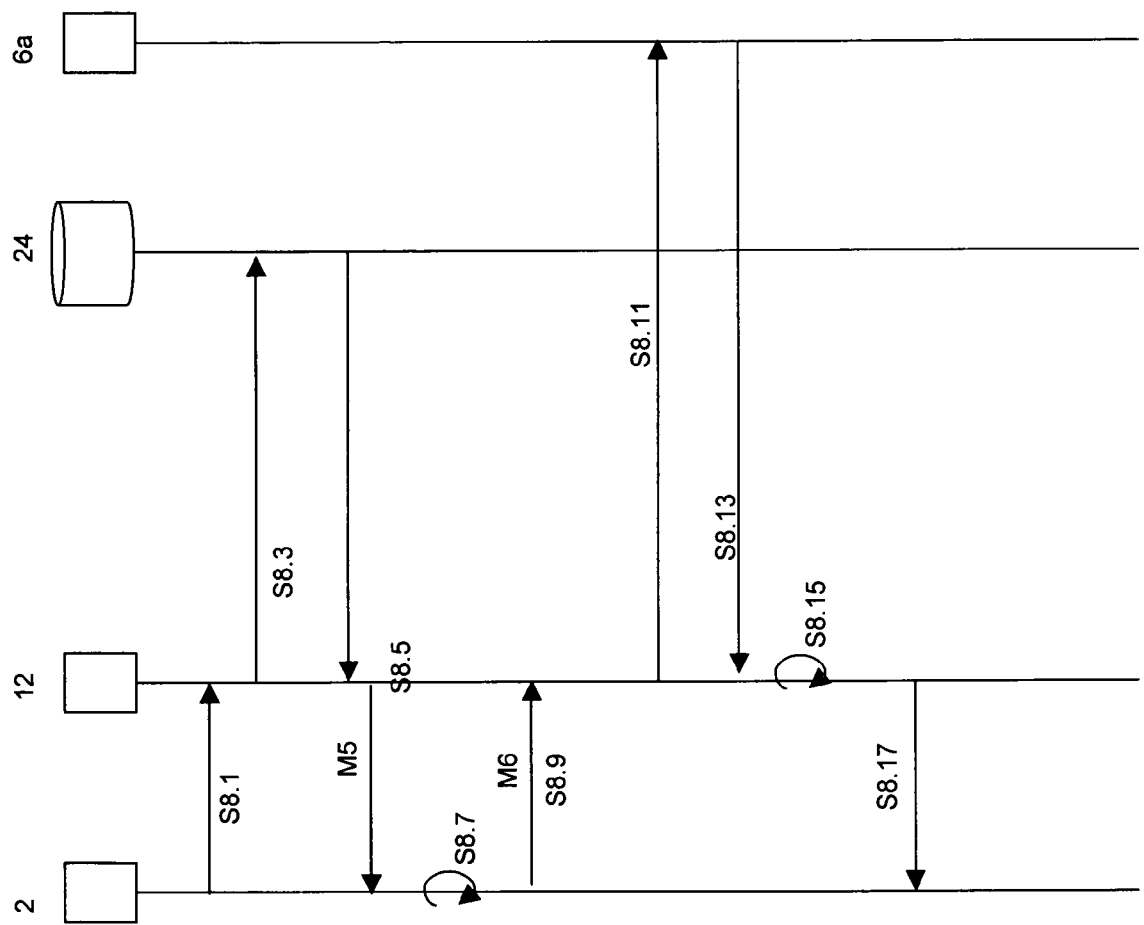
FIG. 8 is a timing diagram showing data flows between components of the distributed information system of FIG. 7 when operating according to a process of an embodiment of the present invention.

In the above embodiments the mobile terminal 2 is described as sending queries for web pages and documents accessible via the web relating to keywords of interest to the user, and there being a search engine 10 arranged to broker, coordinate and account for user access to such content. However, embodiments of the invention could also be applied to arrangements such as that shown in FIG. 7, in which there is a service 12 that can simply provide access to a list of web sites. The service 12 is connected to service database 24, which is arranged to hold records corresponding to those shown in FIG. 2, with or without the inclusion of keywords characterising data accessible from the web sites. In such arrangements the mobile terminal 2 would additionally be equipped with an application (not shown) for accessing the service 12 and requesting information about the various site, in particular links and objects that are accessible from a given site. In view of the fact that access to data and objects in a given site incurs transport costs, the application would be capable of receiving input from the user identifying those parts of the web site that the user does not want to be receive at the mobile terminal (typically resource intensive links or objects). This process is shown in FIG. 8, and largely mirrors the steps described above in relation to FIG. 5: the notable differences to the first embodiment lie in the content sent in message M5 at step S8.5: this includes details of the objects and links that are accessible via the URL listed as a web site accessible via service 12. In addition, step S8.7 involves running an application that allows the user to select objects and links that it does not wish, or wishes to receive from the web site, while message M6 transmitted at step S8.9 additionally includes details of the selected objects and links. As a result, the service 12 acts as a filter in relation to the content accessible from the information provider 6a: as shown in FIG. 8, the service 12 requests data from the website to be transmitted thereto (step S8.11), thereby enabling the service 12 to remove those objects and links specified by the contained within message M6. Accordingly the data that are transmitted to the mobile station 2 at step S8.17 is a subset of the data accessible from the information provider 6a. Clearly, in view of the fact that the resource requirements etc. associated with links and objects are specified in the data transmitted in the message M5 transmitted at step S8.5, the transport costs can be evaluated based on this selected subset of data.

Thus this embodiment of the invention involves the mobile terminal 2 including an application with a user interface that displays data accessible from a specified web site to the user and enables the user to select therefrom. Alternatively the browser or application running on the terminal 2 can be configured so as to automatically request specific types of objects and elements; such a request can be formulated on the basis of selection rules stored by the terminal 2, these rules specifying object size (including resolution in the case of images and file size in relation to file types generally), delivery costs, data plan associated with the terminal 2 etc.

Figure 9:
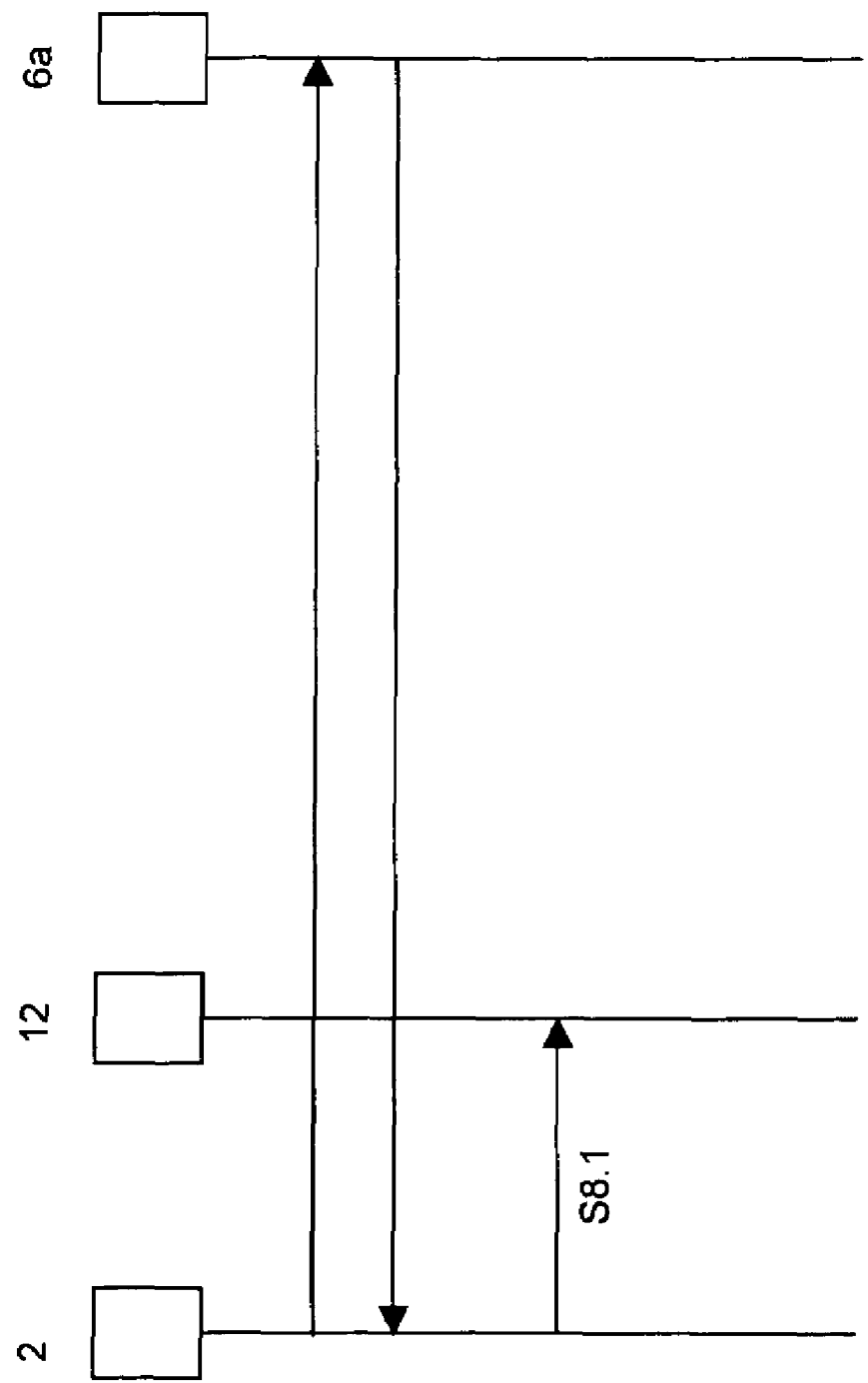
FIG. 9 is a schematic flow diagram showing further steps associated with the embodiment shown in FIG. 8.

As an alternative, the mobile terminal 2 could be equipped with an application that enables the user to enter data indicative of a web site for which transport costs etc. associated with links accessible via the web site are required (i.e. those links for which clicking on the link would lead to the transmission of further data to the mobile terminal); in such arrangements the content of the web site corresponding to the URL entered by the user is downloaded to the mobile terminal, and then forwarded from the mobile terminal to the service 12. This process flow is illustrated in FIG. 9, and receipt of the content from the information provider 6*a* triggers step S8.1 shown in FIG. 8. Subsequent forwarding of the content to the service 12 can occur with or without manual intervention on the part of the user; in the case of manual intervention, the user can specify those particular parts of the web site that are to be filtered from the web site. In cases involving automatic forwarding of the data to the service 12, the application can be configured with access to rules that automatically trigger step S8.1 in response to detection of certain data within the data downloaded from the information source 6*a*.

ADDITIONAL DETAILS AND MODIFICATIONS

The embodiments described in relation to FIG. 8 describe the mobile terminal 2 being configured with a user interface that enables the user to select items from a web site that are to be included/excluded as accessible to the user. The user interface can additionally include means for the user to transmit data indicative of a ranking applied by the user to the content associated with any given information provider 6*a*, 6*b*, 6*c*; this ranking data can be transmitted to the search database 20 (or database 24) or a third party responsible for maintaining the ranking data (which feeds the ranking data into the databases 20, 24 in the manner described above).

The requests submitted at step S5.1 can be submitted from a terminal other than the one to which the search results are to be delivered; for example, requests could be submitted as part of an automated process, which includes, as one of the input fields, an identifier corresponding to the terminal 2 destined to receive the search results. In addition, search requests could be typed in or entered via speech recognition software.

Each record $R_i$ in the search database 20 corresponding to an information provider can additionally comprise a field relating to an account balance for the information provider. The balance is quantified in terms of resources, which can be money or usage of different types of communications services. The latter type of resource are particularly convenient for embodiments of the invention, since communications resources could be directly traded rather than being translated into and out of financial amounts.

Whilst in the above embodiment the results message M1 is delivered directly to the mobile terminal 2, the search results could alternatively be transmitted to a search results service, for further processing of the results or delivery thereof to the mobile device.

The term "sponsored link" is to be understood as subsidizing access to content associated with any of the links listed in the message M1.

By way of clarification, the term "non-sponsored link" is to be understood as including (but not limited to) a link to a network location associated with an information source whose presence in a list of results is defined purely on the relevance of the content of the data items associated with the web page to the request and is unrelated to any subsidy that might be applied to effect delivery thereof.

Additionally, when the terminal 2 requests data from a service such as information provider 6*a*, the browser or application 415 running on the terminal 2 can be configured to request associated ranking and other related information e.g. nested links associated with the information provider 6*a* from the service 12.

The information from service 12 can be used by an application or browser in the terminal 2 to inform the user about certain characteristics of links via the user interface. The requested information can include rating information, mobile friendliness, feasibility of the content behind the link for the target terminal, size of the content, price of the delivery etc., and this information enables the user to decide whether or not to access data from the information provider 6*a*. The user interface can block or hide some of the links on the basis of predefined screening rules held by the mobile terminal 2. These screening rules can include rules relating to e.g. feasibility of accessing a link and content type and can be manually configured by the user of the terminal or automatically set by other authorised users such as parents or employers. Such screening rules can be automatically set on the basis of information uploaded to the service 12 by the authorised users, and then downloaded to the mobile terminal 2 for use in controlling access thereto.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of recording allocation of resources in response to a request, the method comprising:
  receiving the request for a data item from a mobile terminal to be transmitted to a device in a network, the request comprising data indicative of one or more requested items;
  accessing a storage system so as to identify data listings having items providing a match with the requested data item;
  retrieving data indicative of a network location, the network location being indicative of a web page and corresponding to the or each matched data item, the network location having a set of data corresponding to the matched data item;
  retrieving data indicative of an amount of data and a resource allocation associated with the set of data accessible via the network location;
  on the basis of a network subscription associated with the device and the amount of data, evaluating an actual usage of network resources when accessing the set of data;
  in the event that the set of data are accessed from said network location, offsetting said evaluated actual usage against the resource allocation so as to identify an amount of usage of the network resources to be charged to the network subscription; and
  updating a record associated with said data listings so as to log a resource allocation event.

2. The method according to claim 1, including creating a message comprising the amount of data, the resource allocation and the corresponding network location;

sending said created message to a second device accessible within the network; and arranging for said second device to perform said evaluation.

3. The method according to claim 2, including retrieving data indicative of transport costs associated with the network subscription, whereby to evaluate actual usage of the network resources when accessing the set of data.

4. The method according to claim 1, including retrieving data indicative of transport costs associated with the network subscription, whereby to evaluate actual usage of the network resources when accessing the set of data.

5. The method according to claim 2, in which the second device is the device associated with the network subscription, and the transport costs are accessible from a removable storage device associated therewith.

6. The method according to claim 3, in which the second device is the device associated with the network subscription, and the transport costs are accessible from a removable storage device associated therewith.

7. The method according to claim 6, including transmitting data indicative of the amount of usage of the network resources to be charged to a billing system maintained by a network operator associated with the network subscription, for use in decrementing an account balance associated therewith.

8. The method according to claim 5, including transmitting data indicative of the amount of usage of the network resources to be charged to a billing system maintained by a network operator associated with the network subscription, for use in decrementing an account balance associated therewith.

9. The method according to claim 4, including transmitting data indicative of the amount of usage of the network resources to be charged to a billing system maintained by a network operator associated with the network subscription, for use in decrementing an account balance associated therewith.

10. The method according to claim 3, including transmitting data indicative of the amount of usage of the network resources to be charged to a billing system maintained by a network operator associated with the network subscription, for use in decrementing an account balance associated therewith.

11. The method according to claim 2, including transmitting data indicative of the amount of usage of the network resources to be charged to a billing system maintained by a network operator associated with the network subscription, for use in decrementing an account balance associated therewith.

12. The method according to claim 1, including transmitting data indicative of the amount of usage of the network resources to be charged to a billing system maintained by a network operator associated with the network subscription, for use in decrementing an account balance associated therewith.

13. The method according to claim 12, including transmitting data indicative of the amount of the resource allocation to a billing system maintained by the network operator associated with the network subscription, for use in incrementing the account balance associated therewith.

14. The method according to claim 4, including transmitting data indicative of the amount of the resource allocation to a billing system maintained by a network operator associated with the network subscription, for use in incrementing an account balance associated therewith.

15. The method according to claim 2, including transmitting data indicative of the amount of the resource allocation to a billing system maintained by a network operator associated with the network subscription, for use in incrementing an account balance associated therewith.

16. The method according to claim 1, including transmitting data indicative of the amount of the resource allocation to a billing system maintained by a network operator associated with the network subscription, for use in incrementing an account balance associated therewith.

17. The method according to claim 16, including incrementing the account balance prior to providing access to the set of data.

18. The method according to claim 17, including weighting the resource allocation according to a size of at least one data element accessible from the network location, whereby to evaluate said actual usage.

19. The method according to claim 16, including weighting the resource allocation according to a size of at least one data element accessible from the network location, whereby to evaluate said actual usage.

20. The method according to claim 12, including weighting the resource allocation according to a size of at least one data element accessible from the network location, whereby to evaluate said actual usage.

21. The method according to claim 5, including weighting the resource allocation according to a size of at least one data element accessible from the network location, whereby to evaluate said actual usage.

22. The method according to claim 4, including weighting the resource allocation according to a size of at least one data element accessible from the network location, whereby to evaluate said actual usage.

23. The method according to claim 2, including weighting the resource allocation according to a size of at least one data element accessible from the network location, whereby to evaluate said actual usage.

24. The method according to claim 1, including weighting the resource allocation according to a size of at least one data element accessible from the network location, whereby to evaluate said actual usage.

25. The method according to claim 24, including weighting the resource allocation according to a size of a predetermined number of data elements accessible from the network location, whereby to evaluate said actual usage.

26. The method according to claim 25, in which a plurality of data listings corresponds to the or each matched data item, and the method includes displaying said plurality of data listings as a plurality of corresponding selectable links via a user interface on the device.

27. The method according to claim 24, in which a plurality of data listings corresponds to the or each matched data item, and the method includes displaying said plurality of data listings as a plurality of corresponding selectable links via a user interface on the device.

28. The method according to claim 17, in which a plurality of data listings corresponds to the or each matched data item, and the method includes displaying said plurality of data listings as a plurality of corresponding selectable links via a user interface on the device.

29. The method according to claim 16, in which a plurality of data listings corresponds to the or each matched data item, and the method includes displaying said plurality of data listings as a plurality of corresponding selectable links via a user interface on the device.

30. The method according to claim 12, in which a plurality of data listings corresponds to the or each matched data item, and the method includes displaying said plurality of data listings as a plurality of corresponding selectable links via a user interface on the device.

31. The method according to claim 6, in which a plurality of data listings corresponds to the or each matched data item, and the method includes displaying said plurality of data listings as a plurality of corresponding selectable links via a user interface on the device.

32. The method according to claim 4, in which a plurality of data listings corresponds to the or each matched data item, and the method includes displaying said plurality of data listings as a plurality of corresponding selectable links via a user interface on the device.

33. The method according to claim 2, in which a plurality of data listings corresponds to the or each matched data item, and the method includes displaying said plurality of data listings as a plurality of corresponding selectable links via a user interface on the device.

34. The method according to claim 1, in which a plurality of data listings corresponds to the or each matched data item, and the method includes displaying said plurality of data listings as a plurality of corresponding selectable links via a user interface on the device.

35. The method according to claim 34, including ordering the data listings in dependence on the amount of usage of the network resources to be charged to the network subscription.

36. The method according to claim 35, including assigning a classification to the data listings on a basis of the amount of usage of the network resources to be charged to the network subscription.

37. The method according to claim 34, including assigning a classification to the data listings on a basis of the amount of usage of the network resources to be charged to the network subscription.

38. The method according to claim 25, including assigning a classification to the data listings on a basis of the amount of usage of the network resources to be charged to the network subscription.

39. The method according to claim 24, including assigning a classification to the data listings on a basis of the amount of usage of the network resources to be charged to the network subscription.

40. The method according to claim 17, including assigning a classification to the data listings on a basis of the amount of usage of the network resources to be charged to the network subscription.

41. The method according to claim 16, including assigning a classification to the data listings on a basis of the amount of usage of the network resources to be charged to the network subscription.

42. The method according to claim 12, including assigning a classification to the data listings on a basis of the amount of usage of the network resources to be charged to the network subscription.

43. The method according to claim 6, including assigning a classification to the data listings on a basis of the amount of usage of the network resources to be charged to the network subscription.

44. The method according to claim 4, including assigning a classification to the data listings on a basis of the amount of usage of the network resources to be charged to the network subscription.

45. The method according to claim 2, including assigning a classification to the data listings on a basis of the amount of usage of the network resources to be charged to the network subscription.

46. The method according to claim 1, including assigning a classification to the data listings on a basis of the amount of usage of the network resources to be charged to the network subscription.

47. The method according to claim 46, wherein the classifications include fully subsidized, partially subsidized and non-subsidized.

48. The method according to claim 47, including displaying selectable links classified as fully subsidized differently to identifying selectable links classified as partially subsidized and non-subsidized.

49. The method according to claim 46, including displaying selectable links classified as fully subsidized differently to identifying selectable links classified as partially subsidized and non-subsidized.

50. The method according to claim 49, including arranging the data listings in a plurality of portions, each said portion corresponding to one of said classifications, whereby to display said selectable links in accordance with said classifications.

51. The method according to claim 48, including arranging the data listings in a plurality of portions, each said portion corresponding to one of said classifications, whereby to display said selectable links in accordance with said classifications.

52. The method according to claim 34, in which each said data listing in the storage system is further held in association with rating data indicative of the rating applied to the set of data, and the method includes displaying the rating data in conjunction with each said data listing.

53. The method according to claim 35, in which each said data listing in the storage system is further held in association with a rating data indicative of the rating applied to the set of data, and the method includes displaying the rating data in conjunction with each said data listing.

54. The method according to claim 46, in which each said data listing in the storage system is further held in association with a rating data indicative of the rating applied to the set of data, and the method includes displaying the rating data in conjunction with each said data listing.

55. The method according to claim 47, in which each said data listing in the storage system is further held in association with a rating data indicative of the rating applied to the set of data, and the method includes displaying the rating data in conjunction with each said data listing.

56. The method according to claim 49, in which each said data listing in the storage system is further held in association with a rating data indicative of the rating applied to the set of data, and the method includes displaying the rating data in conjunction with each said data listing.

57. The method according to claim 51, in which each said data listing in the storage system is further held in association with a rating data indicative of the rating applied to the set of data, and the method includes displaying the rating data in conjunction with each said data listing.

58. The method according to claim 57, in which the or each requested item is a search term and the or each data listing comprises a search listing stored in association with corresponding search terms.

59. The method according to claim 51, in which the or each requested item is a search term and the or each data listing comprises a search listing stored in association with corresponding search terms.

60. The method according to claim 49, in which the or each requested item is a search term and the or each data listing comprises a search listing stored in association with corresponding search terms.

61. The method according to claim 47, in which the or each requested item is a search term and the or each data listing comprises a search listing stored in association with corresponding search terms.

62. The method according to claim 46, in which the or each requested item is a search term and the or each data listing comprises a search listing stored in association with corresponding search terms.

63. The method according to claim 35, in which the or each requested item is a search term and the or each data listing comprises a search listing stored in association with corresponding search terms.

64. The method according to claim 34, in which the or each requested item is a search term and the or each data listing comprises a search listing stored in association with corresponding search terms.

65. The method according to claim 25, in which the or each requested item is a search term and the or each data listing comprises a search listing stored in association with corresponding search terms.

66. The method according to claim 24, in which the or each requested item is a search term and the or each data listing comprises a search listing stored in association with corresponding search terms.

67. The method according to claim 17, in which the or each requested item is a search term and the or each data listing comprises a search listing stored in association with corresponding search terms.

68. The method according to claim 16, in which the or each requested item is a search term and the or each data listing comprises a search listing stored in association with corresponding search terms.

69. The method according to claim 12, in which the or each requested item is a search term and the or each data listing comprises a search listing stored in association with corresponding search terms.

70. The method according to claim 6, in which the or each requested item is a search term and the or each data listing comprises a search listing stored in association with corresponding search terms.

71. The method according to claim 4, in which the or each requested item is a search term and the or each data listing comprises a search listing stored in association with corresponding search terms.

72. The method according to claim 2, in which the or each requested item is a search term and the or each data listing comprises a search listing stored in association with corresponding search terms.

73. The method according to claim 1, in which the or each requested item is a search term and the or each data listing comprises a search listing stored in association with corresponding search terms.

74. The method according to claim 73, in which the request comprises a search request comprising one or more search terms.

75. The method according to claim 74, in which the or each requested item comprises a name, and the or each data listing comprises a network location stored in association with the name.

76. The method according to claim 73, in which the or each requested item comprises a name, and the or each data listing comprises a network location stored in association with the name.

77. The method according to claim 57, in which the or each requested item comprises a name, and the or each data listing comprises a network location stored in association with the name.

78. The method according to claim 51, in which the or each requested item comprises a name, and the or each data listing comprises a network location stored in association with the name.

79. The method according to claim 49, in which the or each requested item comprises a name, and the or each data listing comprises a network location stored in association with the name.

80. The method according to claim 47, in which the or each requested item comprises a name, and the or each data listing comprises a network location stored in association with the name.

81. The method according to claim 46, in which the or each requested item comprises a name, and the or each data listing comprises a network location stored in association with the name.

82. The method according to claim 35, in which the or each requested item comprises a name, and the or each data listing comprises a network location stored in association with the name.

83. The method according to claim 34, in which the or each requested item comprises a name, and the or each data listing comprises a network location stored in association with the name.

84. The method according to claim 25, in which the or each requested item comprises a name, and the or each data listing comprises a network location stored in association with the name.

85. The method according to claim 24, in which the or each requested item comprises a name, and the or each data listing comprises a network location stored in association with the name.

86. The method according to claim 17, in which the or each requested item comprises a name, and the or each data listing comprises a network location stored in association with the name.

87. The method according to claim 16, in which the or each requested item comprises a name, and the or each data listing comprises a network location stored in association with the name.

88. The method according to claim 12, in which the or each requested item comprises a name, and the or each data listing comprises a network location stored in association with the name.

89. The method according to claim 6, in which the or each requested item comprises a name, and the or each data listing comprises a network location stored in association with the name.

90. The method according to claim 4, in which the or each requested item comprises a name, and the or each data listing comprises a network location stored in association with the name.

91. The method according to claim 2, in which the or each requested item comprises a name, and the or each data listing comprises a network location stored in association with the name.

92. The method according to claim 1, in which the or each requested item comprises a name, and the or each data listing comprises a network location stored in association with the name.

93. The method according to claim 92, in which the name identifies a web site.

94. The method according to claim 93, further comprising, prior to retrieving the data indicative of an amount of data and the resource allocation associated with the set of data accessible via the network location, transmitting the set of data accessible via the network location to the device;

receiving data indicative of selected elements from the set of data;

adjusting the amount of data associated with the set of data on the basis of the selected elements.

95. The method according to claim 92, further comprising, prior to retrieving the data indicative of an amount of data and the resource allocation associated with the set of data accessible via the network location, transmitting the set of data accessible via the network location to the device;

receiving data indicative of selected elements from the set of data;

adjusting the amount of data associated with the set of data on the basis of the selected elements.

96. The method according to claim 95, in which the selected elements relate to elements to be excluded from the set of data accessible from the network location.

97. The method according to claim 94, in which the selected elements relate to elements to be excluded from the set of data accessible from the network location.

98. The method according to claim 95, in which the selected elements relate to elements to be included in the set of data accessible from the network location.

99. The method according to claim 94, in which the selected elements relate to elements to be included in the set of data accessible from the network location.

100. An allocation system for recording allocation of resources in response to a request, the request comprising data indicative of one or more requested items, the system comprising:

a storage system arranged to store a plurality of data listings, each data listing being held in association with one or more of said items, a network location being indicative of a web page and providing access to a set of data, a resource allocation for use in offsetting usage of network resources when accessing the set of data, and a record for logging resource allocation events;

an interface arranged to receive a request for a data item to be transmitted to a device in the network, the request comprising data indicative of the one or more requested items;

a processing system arranged to:

identify data listings having items providing a match with one or more of the requested data items from the storage system;

retrieve data indicative of the network location corresponding to the or each matched data item, said network location having a set of data corresponding to the matched data item; and retrieve the data indicative of an amount of data and the resource allocation associated with the set of data accessible via the network location, the processing system being arranged to evaluate an actual usage of the network resources when accessing the set of data on the basis of a network subscription associated with the device and the amount of data, and in the event that the set of data are accessed from the network location, the processing system is arranged to offset said evaluated actual usage against the resource allocation so as to identify the amount of usage of the network resources to be assigned to the network subscription, wherein the storage system is arranged to update said data listings so as to log a resource allocation event.

101. A mobile terminal arranged to identify resource usage associated with accessing a set of data from a network location, the mobile terminal comprising:

an interface arranged to receive data indicative of an amount of data associated with the set of data accessible via the network location;

a processing system arranged to evaluate an actual usage of network resources when accessing the set of data on the basis of a network subscription associated with a device in the network and the amount of data, said network subscription being accessible by the mobile terminal, wherein the interface is arranged to transmit data indicative of said evaluated actual usage to a further device in the network, said evaluated actual usage being for use in offsetting against a predetermined resource allocation associated with the set of data.

102. The mobile terminal according to claim 101, wherein the processing system is arranged to weight the resource allocation according to a size of at least one data element accessible from the network location, whereby to evaluate said actual usage.

103. The mobile terminal according to claim 102, wherein the processing system is arranged to weight the resource allocation according to a size of a predetermined number of data elements accessible from the network location, whereby to evaluate said actual usage.

104. The mobile terminal according to claim 101, wherein the processing system is arranged to weight the resource allocation according to a size of a predetermined number of data elements accessible from the network location, whereby to evaluate said actual usage.

105. The mobile terminal according to claim 104, wherein the processing system is arranged to weight the resource allocation according to a rating associated with the network location, whereby to evaluate said actual usage.

106. The mobile terminal according to claim 103, wherein the processing system is arranged to weight the resource allocation according to a rating associated with the network location, whereby to evaluate said actual usage.

107. The mobile terminal according to claim 102, wherein the processing system is arranged to weight the resource allocation according to a rating associated with the network location, whereby to evaluate said actual usage.

108. The mobile terminal according to claim 101, wherein the processing system is arranged to weight the resource allocation according to a rating associated with the network location, whereby to evaluate said actual usage.

109. The mobile terminal according to claim 108 comprising a user interface having a display area, wherein the user interface is arranged to display data indicative of the set of data in the display area and to receive data indicative of selected elements from the displayed set of data, and the processing system is arranged to adjust the amount of data associated with the set of data on the basis of the selected elements.

110. The mobile terminal according to claim 107 comprising a user interface having a display area, wherein the user interface is arranged to display data indicative of the set of data in the display area and to receive data indicative of selected elements from the displayed set of data, and the processing system is arranged to adjust the amount of data associated with the set of data on the basis of the selected elements.

111. The mobile terminal according to claim 106 comprising a user interface having a display area, wherein the user interface is arranged to display data indicative of the set of data in the display area and to receive data indicative of selected elements from the displayed set of data, and the processing system is arranged to adjust the amount of data associated with the set of data on the basis of the selected elements.

112. The mobile terminal according to claim 105 comprising a user interface having a display area, wherein the user interface is arranged to display data indicative of the set of data in the display area and to receive data indicative of selected elements from the displayed set of data, and the processing system is arranged to adjust the amount of data associated with the set of data on the basis of the selected elements.

113. The mobile terminal according to claim 104 comprising a user interface having a display area, wherein the user interface is arranged to display data indicative of the set of data in the display area and to receive data indicative of selected elements from the displayed set of data, and the processing system is arranged to adjust the amount of data associated with the set of data on the basis of the selected elements.

114. The mobile terminal according to claim 103 comprising a user interface having a display area, wherein the user interface is arranged to display data indicative of the set of data in the display area and to receive data indicative of selected elements from the displayed set of data, and the processing system is arranged to adjust the amount of data associated with the set of data on the basis of the selected elements.

115. The mobile terminal according to claim 102 comprising a user interface having a display area, wherein the user interface is arranged to display data indicative of the set of data in the display area and to receive data indicative of selected elements from the displayed set of data, and the processing system is arranged to adjust the amount of data associated with the set of data on the basis of the selected elements.

116. The mobile terminal according to claim 101 comprising a user interface having a display area, wherein the user interface is arranged to display data indicative of the set of data in the display area and to receive data indicative of selected elements from the displayed set of data, and the processing system is arranged to adjust the amount of data associated with the set of data on the basis of the selected elements.

117. The mobile terminal according to claim 116, in which the selected elements relate to elements to be excluded from the set of data accessible from the network location.

118. The mobile terminal according to claim 116, in which the selected elements relate to elements to be included in the set of data accessible from the network location.

* * * * *

UNITED STATES PATENT AND TRADEMARK OFFICE
CERTIFICATE OF CORRECTION

PATENT NO. : 7,590,406 B2 Page 1 of 1
APPLICATION NO. : 12/075998
DATED : September 15, 2009
INVENTOR(S) : Janne Aaltonen et al.

It is certified that error appears in the above-identified patent and that said Letters Patent is hereby corrected as shown below:

Title Page, column 1, insert below (65) Prior Publication Data as follows:

--(30) Foreign Application Priority Data
May 18, 2007 (GB) ………………….. GB0709604.3--.

Page 2 of Title Page, column 2, line 6, change "Ramsil et al." to read --Ransil et al.--.

Page 2 of Title Page, column 2, (56) References Cited, OTHER PUBLICATIONS, insert below "Office Action issued from the U.S. Patent and Trademark Office dated July 10, 2009...(9 pages)" as follows:

--U.K. Search Report under Section 17 dated March 18, 2008 in U.K. Application
No. GB 0802366.5--.

Signed and Sealed this

Twenty-seventh Day of April, 2010

David J. Kappos
*Director of the United States Patent and Trademark Office*